(12) United States Patent
Van Wingerden et al.

(10) Patent No.: US 10,906,785 B2
(45) Date of Patent: Feb. 2, 2021

(54) CRANE FOR WIND TURBINE BLADE ASSEMBLY, A VESSEL, A HOISTING METHOD, AND AN ASSEMBLY METHOD

(71) Applicant: ITREC B.V., Schiedam (NL)

(72) Inventors: Mike Van Wingerden, Schiedam (NL); Hendrikus Jacobus Weterings, Schiedam (NL); Mathijs Te Velthuis, Schiedam (NL)

(73) Assignee: ITREC B.V., Schiedam (NL)

( * ) Notice: Subject to any disclaimer, the term of this patent is extended or adjusted under 35 U.S.C. 154(b) by 233 days.

(21) Appl. No.: 16/309,836

(22) PCT Filed: Jun. 15, 2017

(86) PCT No.: PCT/NL2017/050393
§ 371 (c)(1),
(2) Date: Dec. 13, 2018

(87) PCT Pub. No.: WO2017/217845
PCT Pub. Date: Dec. 21, 2017

(65) Prior Publication Data
US 2019/0345011 A1 Nov. 14, 2019

(30) Foreign Application Priority Data
Jun. 15, 2016 (NL) ..................................... 2016973

(51) Int. Cl.
*B66C 23/18* (2006.01)
*B66C 23/52* (2006.01)
*F03D 13/10* (2016.01)

(52) U.S. Cl.
CPC ............ *B66C 23/185* (2013.01); *B66C 23/52* (2013.01); *F03D 13/10* (2016.05); *B66C 2700/0385* (2013.01); *F05B 2230/6102* (2013.01)

(58) Field of Classification Search
CPC ................. B66C 23/52; B66C 23/185; B66C 2700/0385; B66C 13/06; F03D 13/10; F05B 2230/6102
See application file for complete search history.

(56) References Cited

U.S. PATENT DOCUMENTS

| 4,100,873 A | * | 7/1978 | Kaldenbach ............ B63B 43/06 114/125 |
| 10,221,050 B2 | * | 3/2019 | Weterings ............... B66C 23/52 |

(Continued)

FOREIGN PATENT DOCUMENTS

| EP | 2 084 098 A1 | 8/2009 |
| EP | 2 084 098 B1 | 2/2011 |

(Continued)

OTHER PUBLICATIONS

International Search Report, issued in PCT/NL2017/050393, dated Dec. 6, 2017.

(Continued)

*Primary Examiner* — Michael E Gallion
(74) *Attorney, Agent, or Firm* — Birch, Stewart, Kolasch & Birch, LLP

(57) ABSTRACT

A crane includes a crane structure defining a substantially vertical rotation axis; a boom connected with a first end to the crane structure to be rotatable about the vertical rotation axis; a trolley moveable along the boom in longitudinal direction of the boom; a hoisting cable and a load connector. The load connector is arranged at a free end of the hoisting cable to be connected to a load for hoisting purposes. The trolley includes a cable guide to guide the hoisting cable and an attachment configured to temporarily attach the load connector to the trolley to fix the position of the load connector relative to the trolley.

14 Claims, 13 Drawing Sheets

(56) References Cited

U.S. PATENT DOCUMENTS

| | | | | |
|---|---|---|---|---|
| 2014/0076835 A1* | 3/2014 | Herse | .................... | B66C 23/208 |
| | | | | 212/223 |
| 2015/0151953 A1* | 6/2015 | Weterings | ............... | B66C 13/08 |
| | | | | 212/273 |
| 2015/0337798 A1* | 11/2015 | Clymans | ............... | B66C 23/185 |
| | | | | 212/273 |
| 2017/0066631 A1* | 3/2017 | Mupende | ................. | B66D 1/54 |

FOREIGN PATENT DOCUMENTS

| | | |
|---|---|---|
| EP | 2 490 975 A1 | 8/2012 |
| EP | 2 490 975 B1 | 6/2014 |
| GB | 1 223 608 | 2/1971 |
| NL | 7514154 | 2/1976 |
| WO | WO 2009/048322 A1 | 4/2009 |
| WO | WO 2012/002809 A1 | 1/2012 |
| WO | WO 2014/033682 A1 | 3/2014 |

OTHER PUBLICATIONS

Written Opinion of the International Searching Authority, issued in PCT/NL2017/050393, dated Dec. 6, 2017.

* cited by examiner

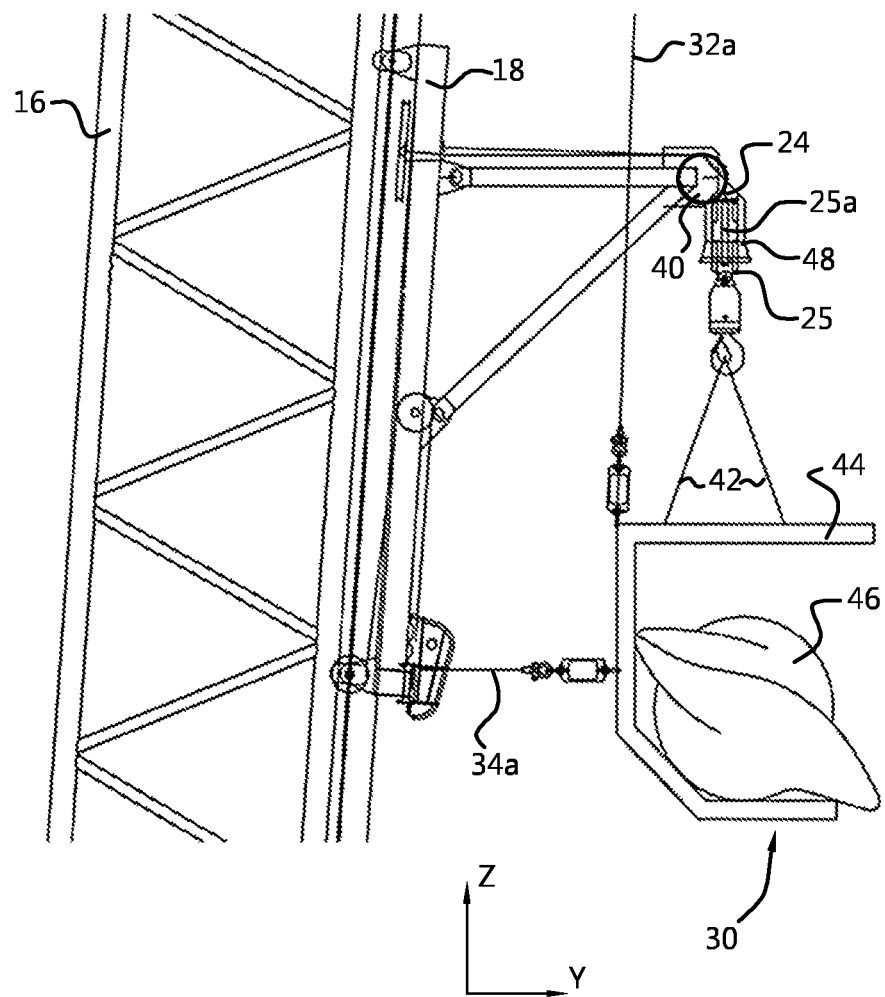

CRANE FOR WIND TURBINE BLADE ASSEMBLY, A VESSEL, A HOISTING METHOD, AND AN ASSEMBLY METHOD

FIELD OF THE INVENTION

The invention relates to a crane and a method for assembling a wind turbine.

Assembly of a wind turbine generally comprises the main steps of:
a. providing a foundation;
b. placing a mast on top of the foundation;
c. placing a nacelle on top of the mast; and
d. connecting a plurality of blades to the nacelle.

The nacelle forms the housing for electromechanical equipment such as a power generator. The blades convert kinetic energy of the wind into a rotational motion of the shaft of the nacelle, which in turn is converted into electrical energy by the power generator. A wind turbine usually comprises three blades, each blade making an angle of 120 degrees with the neighbouring blades.

The blades are designed to be highly susceptible to wind load, but this characteristic makes them difficult to connect to the nacelle as wind may cause the blades to suddenly move relative to already installed components. This makes blade assembly difficult.

When a wind turbine is assembled offshore, the wind load is usually larger than in case of wind turbine assembly on land, so that blade assembly may be more difficult or even impossible.

BACKGROUND OF THE INVENTION

To assemble the blades in a manner less susceptible to wind, prior art solutions use a positioning device that is moveable along a boom of a crane as for instance disclosed in WO2012/002809A1. In this solution, flexibility in the positioning device, e.g. caused by cables or the like, is removed during positioning, so that a rigid yet adjustable connection is obtained between the blade and the boom. Positioning is then no longer affected by swaying of the lifting cables.

A drawback of the solution in WO2012/002809A1 is that the entire weight is carried by the positioning device guided by the boom which weight is transmitted to the boom via several manipulators thereby requiring that the manipulators are complex and heavy in design.

Another solution can be found in WO2014/033682A1, where a trolley is moveable along a boom of a crane. The trolley comprises a guide device to catch a load connector in between a fork to limit sideways motion of the load connector. However, a drawback of this solution is that catching the load connector in between the fork is a relatively complex process involving e.g. tilting the boom upward until it runs so steeply that the load connector comes within reach of the guide device.

OBJECT OF THE INVENTION

Hence, it is an object of the invention to provide a crane that allows an easy blade assembly in a manner less susceptible to wind.

SUMMARY OF THE INVENTION

The invention provides a crane that is configured for hoisting a wind turbine blade held in a horizontal orientation in a frame during the hoisting. The crane comprises:

a crane structure defining a substantially vertical rotation axis;
a boom connected with a first end thereof to the crane structure so as to be rotatable about said vertical rotation axis along with the crane structure;
a trolley that is mounted moveable along the boom in a longitudinal direction of the boom;
a hoisting cable and a load connector, wherein the load connector is arranged at a free end of the hoisting cable and is configured to be connected to a frame holding a wind turbine blade held in a horizontal orientation in a frame during hoisting;
wherein the trolley comprises a cable guide configured to guide the hoisting cable, and wherein the trolley comprises attachment means configured to temporarily attach the load connector to the trolley in order to fix a position of the load connector relative to the trolley.

An advantage of the crane according to the invention is that the hoisting cable is used to carry the weight of the load formed by the frame and the wind turbine blade held by the frame and that separate attachment means are used to position the load connector relative to the trolley.

A further advantage of the crane according to the invention is that the hoisting cable can already be guided by the trolley prior to the load connector being attached to the trolley via the attachment means. This allows to control the position of the load right from the moment the load connector is connected to the load. Further, the hoisting cable can be brought in engagement with the cable guide before connecting to the load which is easier then catching the hoisting cable or load connector after connecting to the load.

In an embodiment, the crane comprises a first pair of tugger lines to position the load in a rotational direction about a horizontal axis in a hoisting plane defined by the vertical rotation axis and the boom. In this embodiment, it will be apparent to the skilled person that there exists a substantial degree of freedom for the load to rotate about the horizontal axis, e.g. relatively to the load connector, which can advantageously be controlled using the first pair of tugger lines.

In an embodiment, the first pair of tugger lines are arranged to extend between the boom at a location above the trolley and the load on either side of the hoisting plane.

In an embodiment, the crane comprises a second pair of tugger lines to position the load in a rotational direction about a vertical axis in a hoisting plane defined by the vertical rotation axis and the boom. In this embodiment, it will be apparent to the skilled person that there exists a substantial degree of freedom for the load to rotate about the vertical rotation axis, e.g. relatively to the load connector, which can advantageously be controlled using the second pair of tugger lines.

In an embodiment, the second pair of tugger lines are arranged to extend between the trolley and the load on either side of the hoisting plane.

In an embodiment, the hoisting cable runs from a fixed location at the free end of the boom downwards towards the cable guide on the trolley. An advantage thereof is that the hoisting cable when not guided by the cable guide on the trolley is able to be used as a standard hoisting device.

In another embodiment, the hoisting cable originates from a winch on the trolley, so that the hoisting cable can be permanently provided from the trolley via the cable guide and no complex catching process needs to be performed.

In an embodiment, the hoisting cable extends parallel to the longitudinal direction of the boom and is directed towards the cable guide on the trolley by a sheave also arranged on the trolley.

In an embodiment, the cable guide is a sheave.

The invention also relates to a vessel comprising a crane according to the invention.

In an embodiment, the vessel comprises a single hull, and a ballast system. The single hull has a hull shape and is designed with a transit displacement at a transit draft and a maximum displacement at a maximum draft, the maximum draft being larger than the transit draft. The hull shape is defined by frames, comprising a main frame, and waterlines, comprising a transit waterline at the transit draft, and a maximum waterline at the maximum draft. The hull shape is symmetrical with respect to a centreline plane which extends in a horizontal length and a vertical height direction of the hull. The single hull has a design length along the maximum waterline and a maximum width, the main frame being halfway the design length, the part of the single hull in front of the main frame being referred to as fore part of the hull and the part of the single hull aft of the main frame being referred to as aft part of the hull. The single hull comprises a bottom, a bilge, and a side, the bilge being the transition between the bottom and the side, at the main frame. The side comprises an oblique side part and a vertical side part, the vertical side part being at a greater distance from the centreline plane than the bilge. The oblique side part extends from the bilge to the vertical side part. The ballast system comprises ballast water tanks with a capacity that is at least equal to the difference between the maximum displacement and the transit displacement for changing the draft of the vessel from the transit draft to the maximum draft. The transit waterline intersects the oblique side part.

Taking water into the ballast water tanks results in the draft increasing from the transit draft to an increased draft which is between the transit draft and the maximum draft. Thanks to the oblique side parts, taking in ballast water immediately results in increasing the metacentre height, which is favourable for certain installation operations as a larger metacentre height results in smaller heel angles when a mass is moved in a width direction of the vessel. Thanks to the oblique sides, the metacentre height keeps on increasing with the intake of more ballast water until the maximum draft is reached. This enables choosing an optimum metacentre height for the current operation of the vessel. Thanks to the combination of a sufficient ballast water tank capacity and the oblique side parts, there are no doors required. A vessel without such doors, and oblique side parts starting directly from the bilge and extending to the vertical side parts, is cheaper to build and to maintain than a vessel of NL-A-7.514.154.

Another advantage of the oblique side part extending from the bilge to the vertical side part is that this results in a lighter structure for a given displacement than the vessel of NL-A-7.514.154, where the side has first an extra vertical part, and then a buckle from where the oblique side part starts.

It is noted that GB-1.223.608 discloses a hull shape with oblique and vertical side parts per se. This is however a regular freight vessel, which may have a ballast system sufficiently large to keep the propeller under water when it does not carry cargo, but certainly not a ballast system which may change the draft of the vessel from a transit draft to a maximum draft. Moreover, this vessel does not have crane designed to install structures at sea.

Preferably, the vessel further comprises a bilge-keel with a height, measured from attachment at the hull to an outer edge, of at least 17%, preferably at least 20%, of the maximum draft. Such relative large bilge-keels will aid in damping rolling motions of the vessel which might be heavier due to the oblique side parts, than with a more conventional hull shape.

In an embodiment, the height of the oblique side part is at least 50%, preferably at least 60%, more preferably at least 65% of the overall height of the side. The larger the oblique side part is, the better it is possible to fine tune the required metacentre height by taking in ballast water.

In an embodiment, the inclination of the oblique side part with respect to centreline plane is between 35° and 55°, preferably between 40° and 50°, more preferably between 43° and 47°. A relative low value of the inclination within these ranges reduces the risk of slamming of waves against the oblique side part. A relative large value of the inclination within these ranges results in a relative wide range of potential metacentre heights.

In an embodiment, the vertical side part has a width which equals to the maximum width over at least 90%, preferably 95%, more preferably 99% of the length of the aft part of the hull. Extending the maximum width backwards results in a large available deck area at the aft part of the vessel, which is favourable for different types of installation activities. Moreover, it improves the stability of the vessel.

In an embodiment, the vertical side part has a width which equals to the maximum width over at least 15% of the length of the fore part of the hull. Extending the maximum width forwards results in a large available deck area at the mid and fore part of the vessel, which is favourable for different types of installation activities. Moreover, it improves the stability of the vessel.

In an embodiment, the oblique side part extends over at least 90%, preferably over at least 95%, of the full length of the hull. This increases the stability.

In an embodiment, the vertical side part merges into the oblique side part in the fore part of the hull. This results in a smooth bow form of the hull which is favourable when the vessel is travelling in head waves.

In an embodiment, all waterlines of the oblique side part are fairing from the front to the aft of the vessel. Fairing waterlines of the oblique side part results in less resistance when the vessel is moving forward.

In an embodiment, all waterlines of the vertical side part are fairing from the front to the aft of the vessel. Fairing waterlines of the vertical side part results in a more gradual change of the hydrostatic properties of the hull when the draft is increased to a draft which intersects the vertical side part, or when the draft is just below the transition of the oblique side part to the vertical side part and the vessel heels.

Preferably, the maximum draft intersects the vertical side part. The maximum draft with corresponding maximum metacentre height will in many cases be required when lifting or shifting relative large masses on board. Having vertical side parts of this draft, results in smaller changes of some of the hydrostatic properties when the vessel heels than in case the sides at the maximum draft are oblique.

In a preferred embodiment, the upper margin of the bilge is tangent to the lower margin of the oblique side part. This optimises the ratio between displacement on one hand and weight of the ship construction and hull surface area on the other hand.

In order to drive foundation piles into the bottom of the sea, the vessel may be equipped with a pile-driver that is arrangeable on a foundation pile, wherein the pile-driver comprises a liquid body arranged above a combustion space, such that upon ignition of fuel in the combustion space, the expansion of the fuel displaces the liquid body upwards. The expansion of the fuel itself will result in a downward force on the foundation pile as will the liquid body when it falls back to its original location, thereby driving the pile into the ground.

The invention further relates to a method to hoist a load comprising the following steps:
a. providing a crane according to the invention;
b. arranging the hoisting cable such that the hoisting cable is guided by the cable guide on the trolley;
c. positioning the trolley over the load;
d. connecting the load to the load connector; and
e. lifting the load.

In an embodiment, the first pair of tugger lines and/or the second pair of tugger lines are connected to the load prior to lifting the load.

In an embodiment, the load is a wind turbine blade, preferably held in a transport and assembly frame.

The invention also relates to a vessel comprising a plurality of wind turbine blades, wherein each wind turbine blade is held by a transport and assembly frame, and wherein the transport and assembly frames are stacked on a deck of the vessel.

In an embodiment, the wind turbine blades extend in a transverse direction of the vessel.

In an embodiment, each transport and assembly frame comprises a clamping mechanism to fix the wind turbine blade relative to the transport and assembly frame.

In an embodiment, the clamping mechanism is further configured to move the wind turbine blade relative to the transport and assembly frame for fine positioning of the blade during wind turbine assembly.

In an embodiment, each transport and assembly comprises a power unit to power the clamping mechanism.

The invention also relates to a method for assembling a wind turbine comprising the following steps:
a. providing a wind turbine lacking at least one wind turbine blade;
b. providing a vessel comprising a plurality of wind turbine blades, wherein each wind turbine blade is held by a transport and assembly frame, and wherein the transport and assembly frames are stacked on a deck of the vessel;
c. hoisting a transport and assembly frame including wind turbine blade from the vessel and subsequently positioning the wind turbine blade relative to the wind turbine for connecting;
d. connecting the wind turbine blade to the wind turbine; and
e. disengaging the transport and assembly frame from the wind turbine blade.

In an embodiment, step c. is carried out by a crane according to the invention that is provided on the vessel.

The invention will now be described in a non-limiting way by reference to the accompanying drawings in which like parts indicate like reference numerals.

BRIEF DESCRIPTION OF THE DRAWINGS

FIG. 3 depicts a side view of the trolley of the vessel of FIG. 1 in more detail;
FIGS. 10-15 depict a lines plan of the hull of FIG. 1 or FIG. 8, wherein
FIG. 10 depicts a profile view with buttock lines of the aft vessel;
FIG. 11 depicts a plan view with water lines of the aft vessel;
FIG. 12 depicts a body plan view with frame lines of the aft vessel;
FIG. 13 depicts a profile view with buttock lines of the front vessel;
FIG. 14 depicts a plan view with water lines of the front vessel;
FIG. 15 depicts a body plan view with frame lines of the front vessel.

DETAILED DESCRIPTION OF EMBODIMENTS

Figure 1:
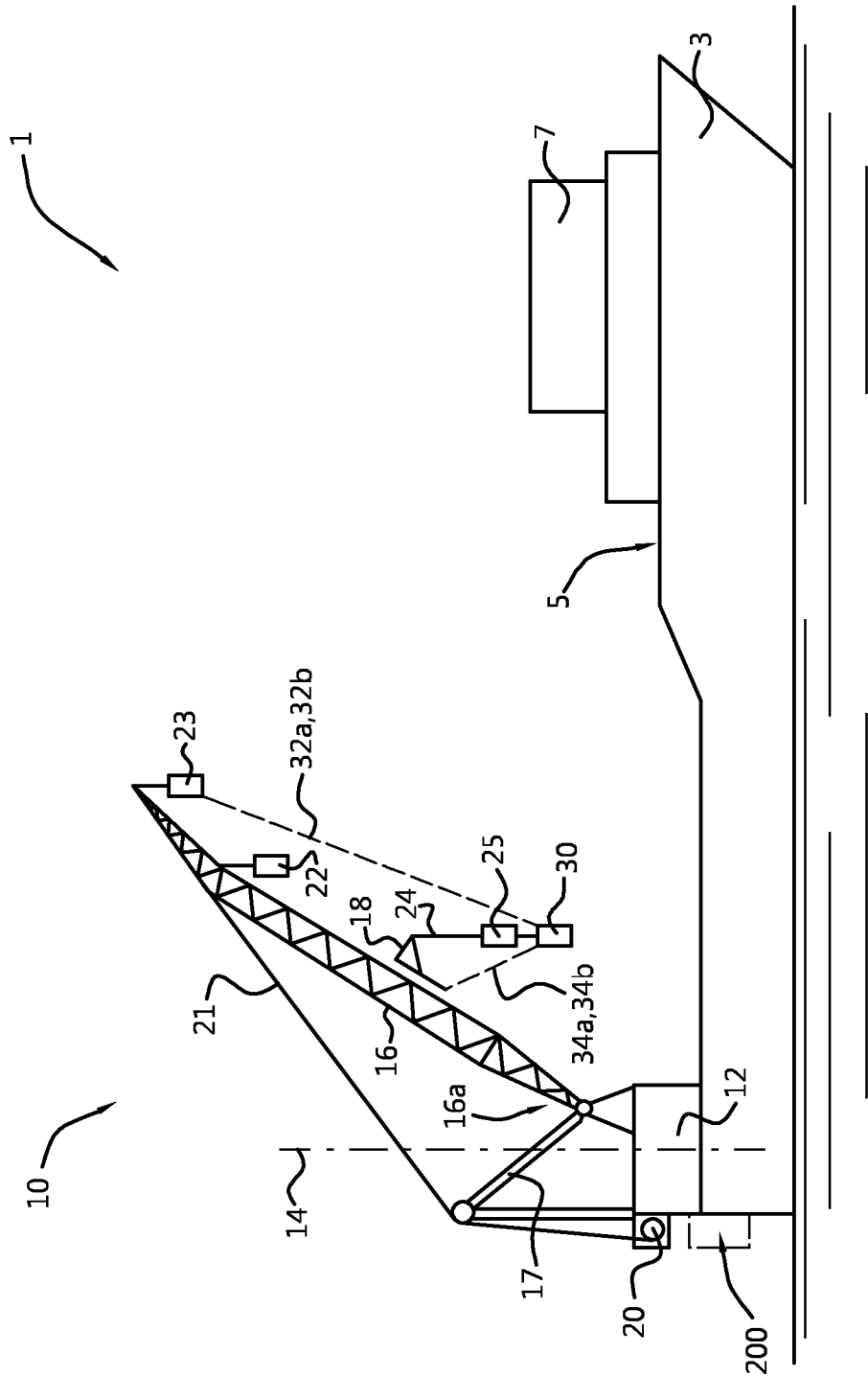
FIG. 1 schematically depicts a vessel according to an embodiment of the invention.

FIG. 1 schematically depicts a vessel 1 according to an embodiment of the invention with a hull 3, a deck 5, accommodations 7 and a crane 10.

The crane 10 comprises a crane structure 12, defining a substantially vertical rotation axis 14, and a boom 16 connected with a first end 16a to the crane structure 12 to be rotatable about the vertical rotation axis 14. A hoisting plane is defined by the vertical rotation axis 14 and the boom 16, so that the hoisting plane in FIG. 1 is parallel to the plane of drawing.

In this embodiment, the crane 10 is provided with a main hoisting system and an auxiliary hoisting system. The main and auxiliary hoisting system are schematically indicated by winch 20, hoisting cables 21 and load connectors 22 and 23.

Moveably mounted to the boom 16 is a trolley 18 allowing to move the trolley 18 along the boom 16 in a longitudinal direction of the boom 16. Extending from the trolley 18 is a hoisting cable 24. A load connector 25 is provided at a free end of the hoisting cable 24 to be connected to a load 30 for hoisting purposes.

In order to control the position of the load 30, a first pair of tugger lines 32a, 32b extend between the boom 16 at a location above the trolley 18 and the load 30 on either side of the hoisting plane, and a second pair of tugger lines 34a, 34b extend between the trolley 18 and the load 30 on either side of the hoisting plane.

Figure 2:
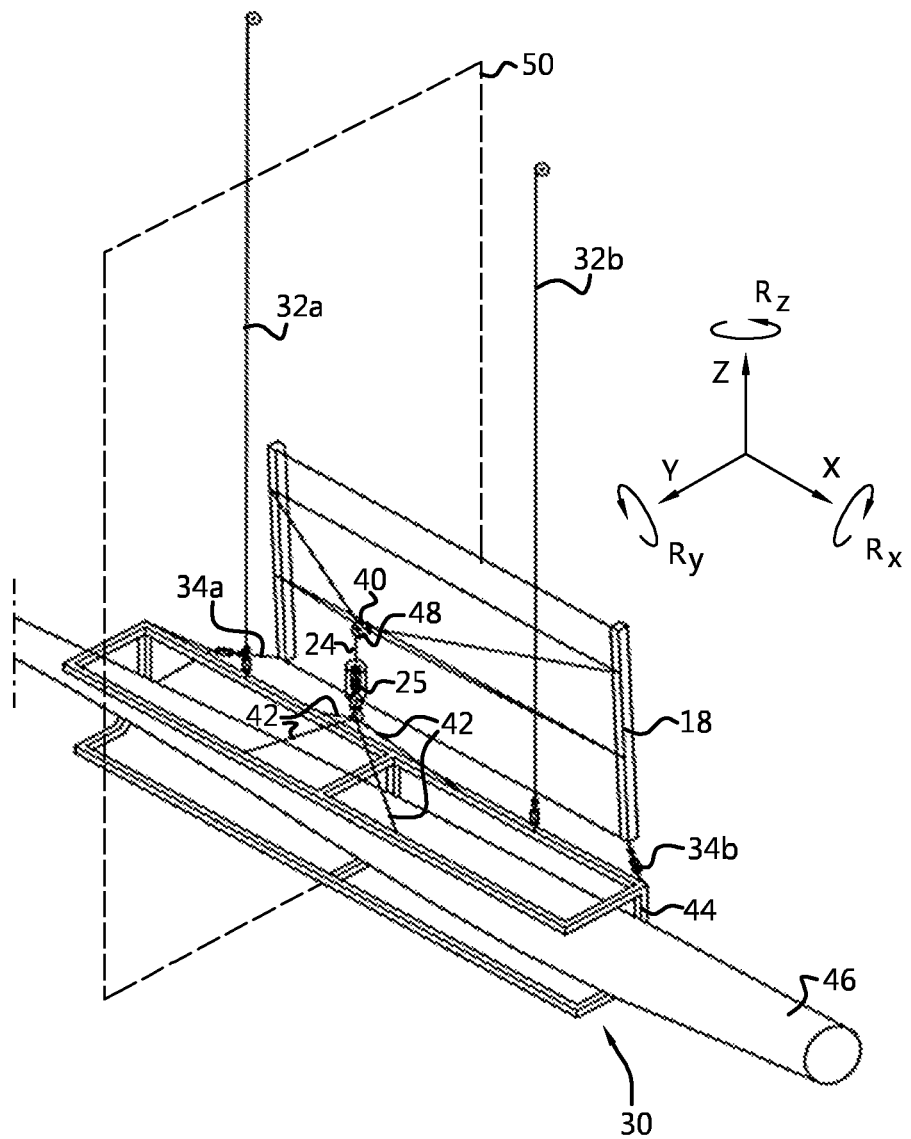
FIG. 2 schematically depicts a perspective view of an embodiment of the trolley of the vessel of FIG. 1 in more detail.

The trolley 18 is depicted in more detail in FIGS. 2 and 3. FIG. 2 provides a perspective view of a schematic representation of the trolley 18 carrying a load 30. FIG. 3 provides a side view of the trolley 18 and load 30. For clarity reasons, the boom 16 along which the trolley 18 is moveable is not depicted in FIG. 2.

The trolley 18 comprises a cable guide 40 to guide the hoisting cable 24. The hoisting cable 24 is only depicted to extend downwards from the cable guide 40. Where the hoisting cable 24 is originating from will be explained in more detail below.

At a free end of the hoisting cable 24, the load connector 25 is provided. The load connector carries the load 30, here by holding support cables 42 that are connected to a transport and assembly frame 44 that in turn holds and supports a wind turbine blade 46 in a horizontal orientation.

Due to the use of a hoisting cable 24, the load 30 can sway in the Y-direction and the X-direction and can rotate in the Rx, Ry and Rz directions respectively about the X-, Y- and Z-direction. The longer the hoisting cable 24, the more swaying is possible.

The trolley 18 therefore further comprises attachment means 48 to temporarily attach the load connector 25 to the trolley 18. In this embodiment, the attachment means 48 form a cavity in which the sheave block 25a of the load connector can be received by hauling in hoisting cable 24, thereby preventing further movement of the load connector in the X-, Y- and Z-direction. In FIG. 2, the load connector 25 is not attached to the attachment means 48. In FIG. 3, the load connector 25 is attached to the attachment means. However, due to the holding support cables there is still a substantial degree of freedom for the load 30 to rotate in the Rx, Ry and Rz directions.

The first pair of tugger lines 32a and 32b and the second pair of tugger lines 34a and 34b, in the shown position of the load 30 relative to the trolley 18, position the load 30 in a rotational direction Ry about the Y-direction, and position the load 30 in a rotational direction Rz about the Z-direction.

Also depicted in FIG. 2 is the hoisting plane 50 defined by the vertical rotation axis 14 and the boom 16, i.e. a centreline of the boom 16. The cable guide 40, the hoisting cable 24 and the load connector 25 are all arranged in the hoisting plane to minimize bending moments about the Y-direction.

The tugger lines 32a, 32b of the first pair of tugger lines are arranged on opposite sides of the hoisting plane as are the tugger lines 34a, 34b of the second pair of tugger lines.

The first pair of tugger lines 32a, 32b are connected at one end to the transport and assembly frame 44 and extend to a fixed location on the boom above the trolley as indicated in FIG. 1.

The second pair of tugger lines 34a, 34b are connected at one end to the transport and assembly frame 44 and extend to the trolley 18.

The first pair of tugger lines 32a, 32b in combination with the hoisting cable 24 and the load connector 25 are able to position the load 30 in a rotational direction Rx about the X-direction due to the fact that the tugger lines 32a, 32b are at a distance from the hoisting cable 24 and load connector 25 seen in the Y-direction as is best seen in FIG. 3.

Figure 4:
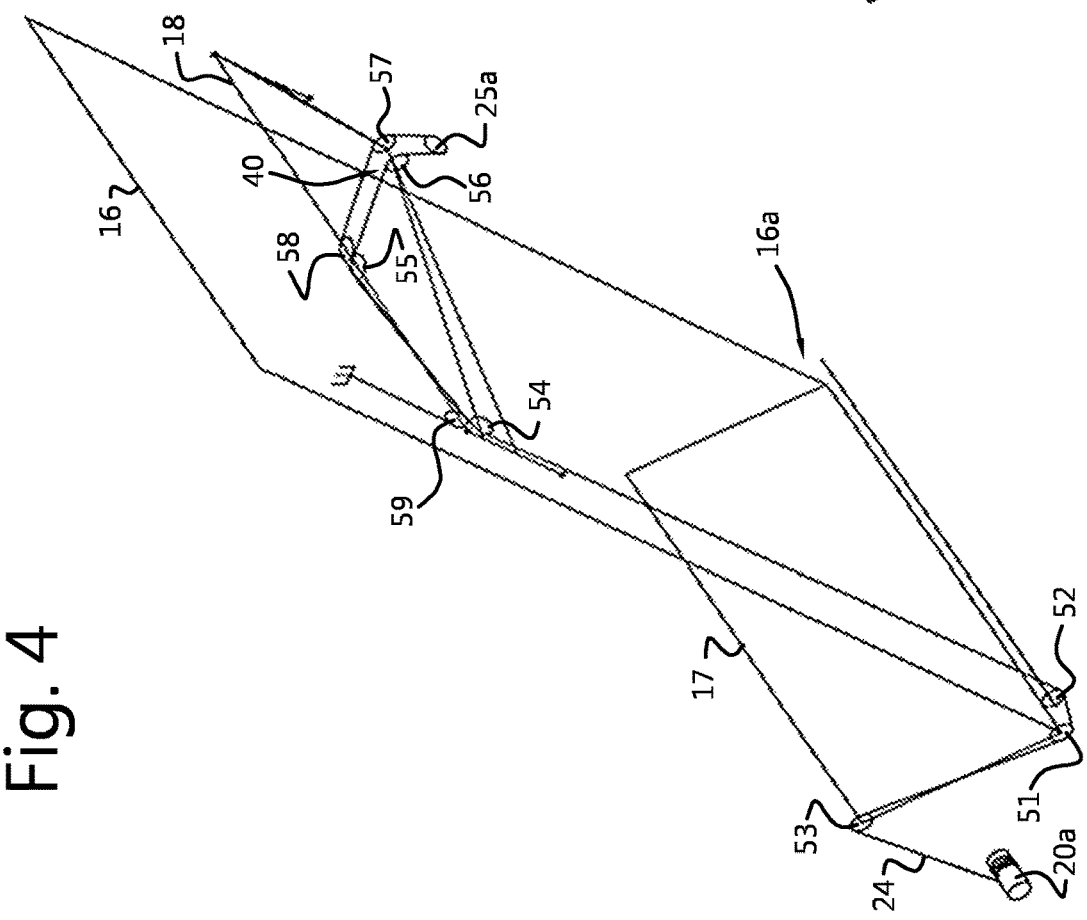
FIG. 4 schematically depicts an embodiment of reeving of the hoisting cable.

FIG. 4 schematically depicts a possible embodiment for the reeving of the hoisting cable 24. Schematically depicted are the boom 16 and a luffing frame 17, which luffing frame is also shown in FIG. 1.

One terminal end of the hoisting cable is wound on a winch 20a, which winch 20a can be part of the winch arrangement 20 depicted in FIG. 1. The hoisting cable 24 is guided via the luffing frame 17 and corresponding sheaves 51, 52 and 53 to enter the boom at the first end 16a of the boom 16.

The trolley 18 is schematically depicted alongside the boom 16. Arranged on the trolley is a sheave 54 to direct the hoisting cable 24 towards the hoisting plane in the centre of the boom 16. Sheave 55 on the trolley 18 at the hoisting plane in turn directs the hoisting cable towards the cable guide 40 arranged on the trolley, here embodied as a sheave 56. The hoisting cable then extends downwardly from the sheave 56 to the sheave block 25a of the load connector and back to sheave 57 of the cable guide 40 on the trolley 18. Hoisting cable 24 is then directed back to the side of the boom 16 by sheave 58 and upwards parallel to the boom by sheave 59 on the trolley. The opposite terminal end of the hoisting cable then connected to the boom 16 at an elevated position on the boom 16. This reeving arrangement has the advantage that the relative position of the sheave block 25a relative to the cable guide 40 on the trolley 18 is independent of the position or movement of the trolley 18 along the boom 16.

Figure 5:
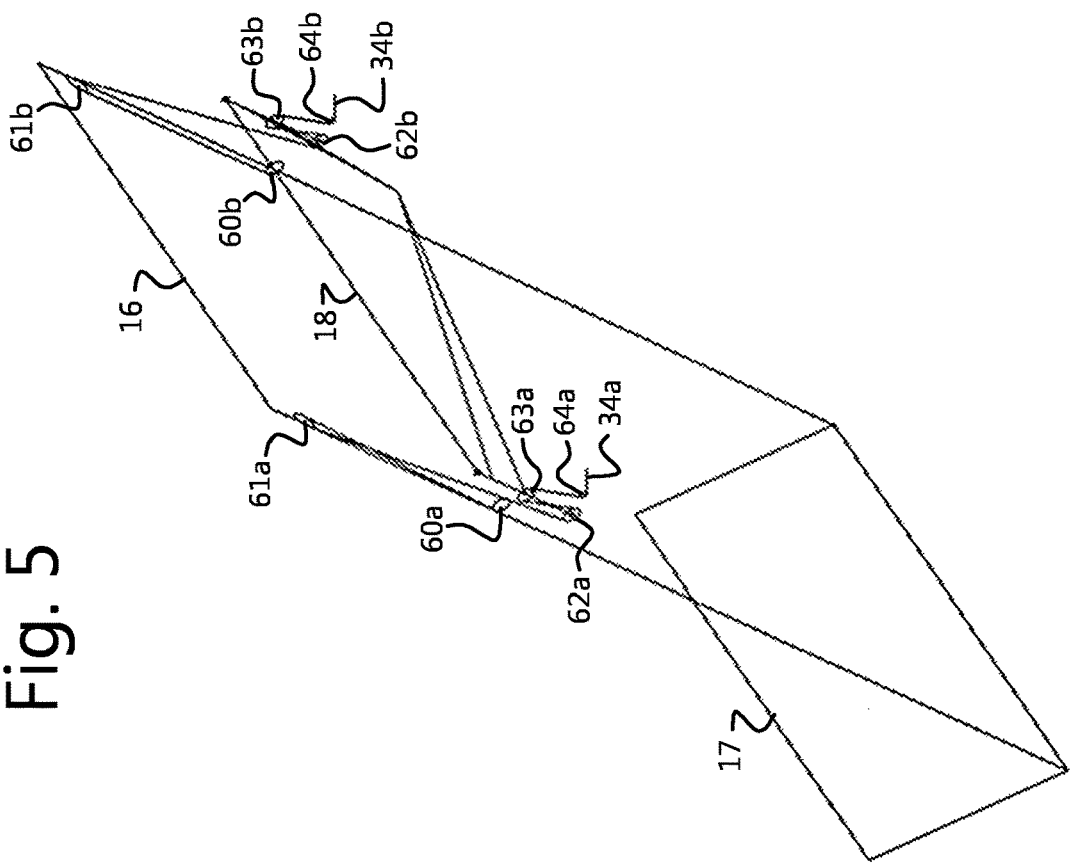
FIG. 5 schematically depicts an embodiment of reeving of the second pair of tugger lines.

FIG. 5 schematically depicts an embodiment of reeving of the second pair of tugger lines 34a, 34b. Schematically depicted are the boom 16 and the luffing frame 17, which luffing frame is also shown in FIG. 1.

With respect to the tugger line 34a, a terminal end of the tugger line 34a is arranged on a winch 60a located halfway of the boom 16. The tuggerline 34a extends upwards to a sheave 61a above the moving range of the trolley 18, which sheave 61a directs the tugger line downwards towards the trolley 18. By providing the sheave 61a above the moving range of the trolley 18, it is always ensured that the tugger line 34a approaches the trolley 18 from above.

Provided on the trolley 18 are sheaves 62a, 63a and 64a to guide the tugger line 34a. When connecting the opposite terminal end of the tugger line 34a to a load, the tugger line extends between the load and the trolley.

The configuration in FIG. 5 is symmetrical with respect to the hoisting plane, so that for tugger line 34b a similar arrangement is provided including winch 60b and sheaves 61b, 62b, 63b and 64b.

Figure 6:
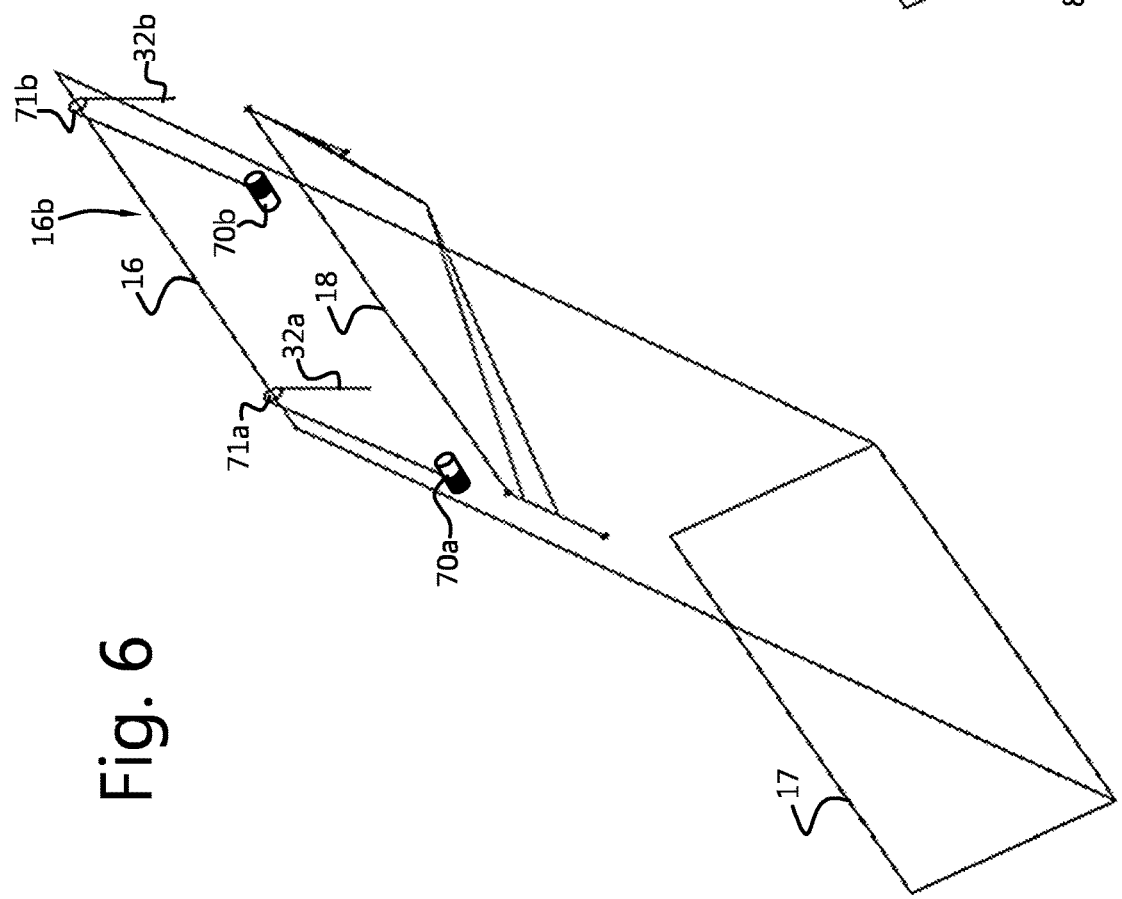
FIG. 6 schematically depicts an embodiment of reeving of the first pair of tugger lines.

FIG. 6 schematically depicts an embodiment of reeving of the first pair of tugger lines 32a, 32b. Schematically depicted are the boom 16, the luffing frame 17, which luffing frame is also shown in FIG. 1, and the trolley 18 that is moveable relative to the boom 16.

With respect to the tugger line 32a, a terminal end of the tugger line 32a is arranged on a winch 70a located at an upper side of the boom 16. The tugger line 32a extends upwards to a sheave 71a. The sheave 71a directs the tugger line 32a downwards towards the load. When the opposite terminal end of the tugger line 32a is connected to the load, the tugger line 32a extends between a free end 16b of the boom 16 and the load.

The configuration in FIG. 6 is symmetrical with respect to the hoisting plane, so that for tugger line 32b a similar arrangement is provided including winch 70b and sheave 71b.

Figure 7:
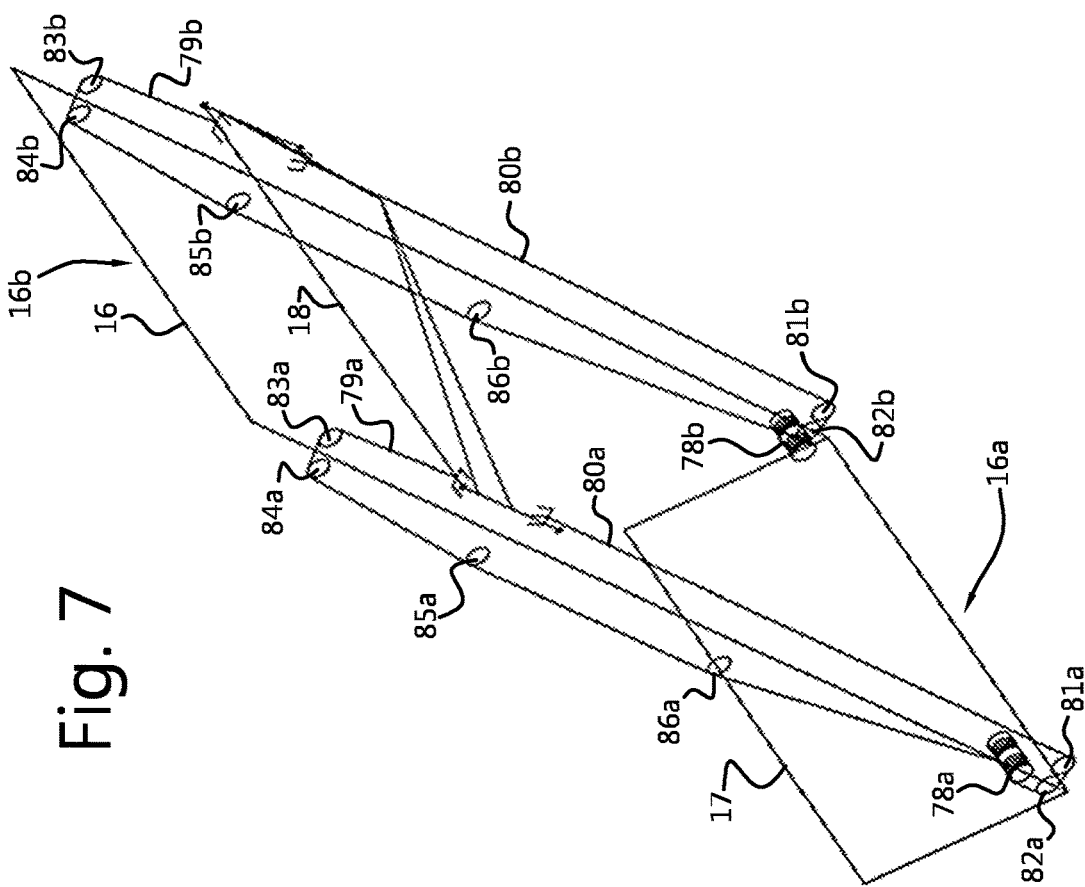
FIG. 7 schematically depicts an embodiment of a displacement system to displace the trolley along the boom.

FIG. 7 schematically depicts an embodiment of a displacement system to displace the trolley 18 along the boom 16. Schematically depicted is also the luffing frame 17 also shown in FIG. 1.

The trolley 18 is moveable relative to the boom 16 in the longitudinal direction of the boom 16. Moving the trolley can be done in many ways by a displacement system. One of the possible embodiments is depicted in FIG. 7.

The displacement system comprises a symmetrical configuration. First the arrangement on the left side of the boom 16 will be elucidated.

Connected to a lower side of the trolley 18 is a cable portion 80a, which cable portion 80a extends downwards from the trolley 19, parallel to the boom 16, to a lower end 16a of the boom 16 and is guided by sheaves 81a, 82a to a winch 78a.

Connected to an upper side of the trolley 18 is a cable portion 79a, which cable portion 79a extends upwards from the trolley, parallel to the boom 16, to an upper end 16b of the boom 16 and is guided by sheaves 83a, 84a, 85a, 86a, to the winch 78a.

Cable portions 79a and 80a are wound on the winch 78a such that operation of the winch 78a will pay out one of the cable portions and simultaneously haul in the other one of the cable portions. The cable portions 79a and 80a may be different portions of a single cable, but cable portions 79a and 80a may alternatively be part of separate cables.

As mentioned before, the configuration is symmetrical with respect to the hoisting plane, so that on the right side of the boom 16 a similar arrangement is provided including cable portions 79b, 80b, winch 78b and sheaves 81b, 82b, 83b, 84b, 85b, 86b.

Connecting a cable portion to the lower and upper side of the trolley allow to apply upwardly directed forces to the trolley as well as downwardly directed forces, so that independent of other forces applied to the trolley, the displacement system is able to raise or lower the trolley with respect to the boom.

It will be clear for the skilled person that the abovementioned reeving embodiments are merely examples to obtain the corresponding functions, but that alternative embodiments are well feasible, as well as symmetrical configurations as asymmetrical functions.

Figure 8:
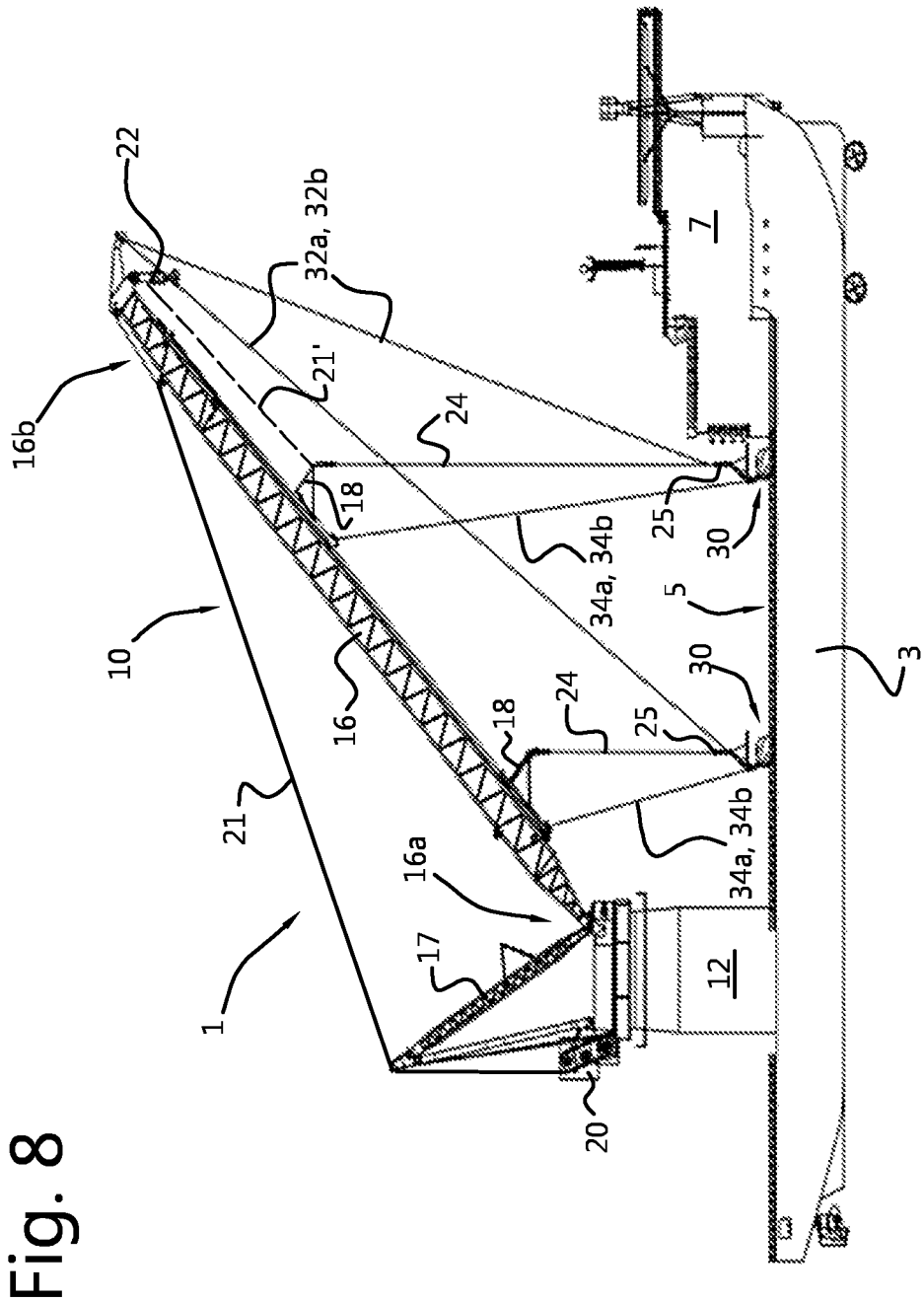
FIG. 8 depicts a vessel according to another embodiment of the invention.

As an example thereof, the hoisting cable 24 in the embodiment of FIG. 4 is a dedicated hoisting cable to be permanently provided on the boom and trolley as indicated in FIG. 4. However, in an alternative embodiment, the hoisting cable originates from somewhere else, e.g. a hoisting system also suitable for standard hoisting operations. The hoisting cable will then originate from a fixed location at the free end 16b of the boom 16. Hence, in that case, for instance hoisting cable 21 and load connector FIG. 8 depicts a vessel 1 according to another embodiment of the invention with a hull 3, a deck 5 accommodations 7 and a crane 10. The embodiment of FIG. 8 is similar to the embodiment of FIG. 1. Hence, the same numbering is adhered to here as in FIG. 1 and no elaborate explanation will be given. Besides the less schematic embodiment, the main differences are the position of the crane 10 on the deck 5, and the lack of an auxiliary hoist system.

The trolley 18 is depicted in two difference positions along the boom 16. Hence, in this embodiment there is only one trolley present, but for simplicity reasons depicted in two different position simultaneously to show the working of the crane.

In order to hoist a load 30 from the deck 5, the following steps are carried out. First, the crane is provided on the deck 5 of the vessel 1, and the hoisting cable 24 is arranged such that the hoisting cable is guided by a cable guide on the trolley 18. As the reeving of the hoisting cable 24 is here similar to the embodiment shown in FIG. 4, arranging the hoisting cable in engagement with the cable guide is done during assembly of the crane. Providing the crane is done during assembly of the crane on the vessel.

However, in an alternative embodiment, when the main hoisting system including hoisting cable 21 and load connector 22 are used as hoisting cable 24 and load connector 25 respectively, the hoisting cable 21 and load connector 22 first have to be arranged such that hoisting cable 21 is guided by the cable guide, e.g. a sheave, on the trolley. This alternative is indicated by a dashed line 21' between the free end of the boom and the trolley on the right showing how the hoisting cable 21 would extend between the free end of the boom towards the cable guide on the trolley.

An advantage of the invention is that the load connector 25 can be positioned over the load by moving the trolley along the boom 16 without the need of moving the boom itself. Hence, for hoisting the load 30 on the left, the trolley is moved near the end 16a of the boom 16 and for hoisting the load 30 on the right, the trolley is moved near the free end 16b of the boom 16. Due to the cable guide on the trolley, the hoisting cable is moved along with the trolley and thus no complex or tedious catching process is required.

When the trolley is positioned over the load 30, the hoisting cable can be paid out to connect the load to the load connector. It is preferred that the first pair of tugger lines 32a, 32b and the second pair of tugger lines 34a, 34b are connected to the load while the load is still resting on the deck 5. This makes connecting the tugger lines easy and allows to control the position of the load during the entire hoisting process.

Figure 9:
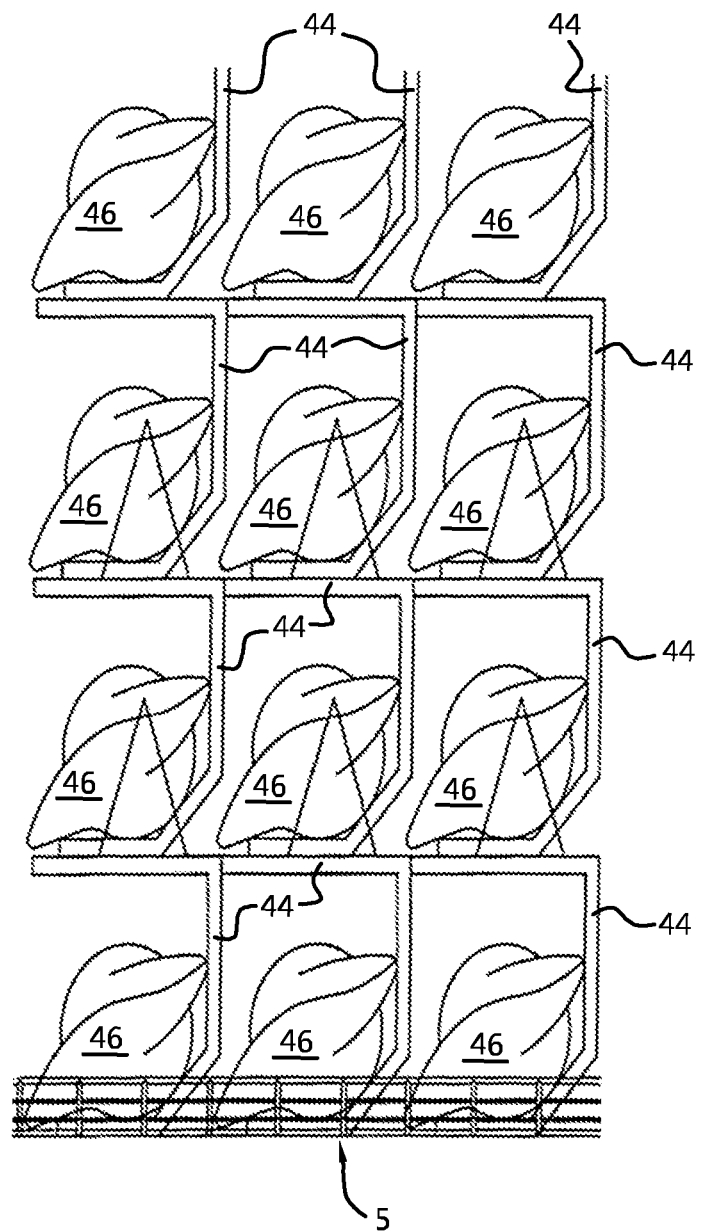
FIG. 9 depicts a stack of wind turbine blades on a deck of a vessel.
Figure 10:
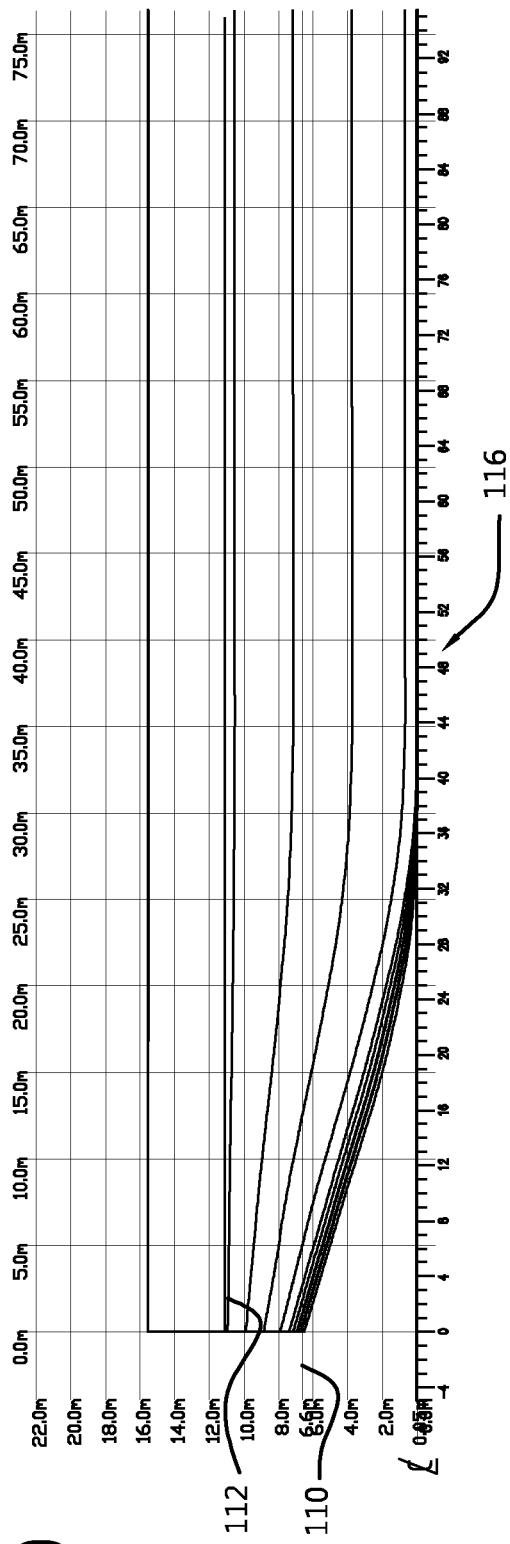

FIG. 9 depicts a deck 5 of a vessel, e.g. the vessel of FIG. 1 or 8, and arranged on the deck 5 a plurality of wind turbine blades 46, wherein each wind turbine blade 46 is provided in a corresponding transport and assembly frame 44. The frame 44 is similar to the frame 44 as shown in FIG. 2 and allows, due to its substantially rectangular outer contour, to stack the transport and assembly frames 44. Hence, the load connector 25 and tugger lines only need to be connected to the frame 44 to start handling a wind turbine blade for assembly. After assembly, the frame can be disengaged from the load connector and tugger lines and a subsequent blade can be handled by merely connecting the load connector and tugger lines to the frame 44.

The hull 3 of both embodiments depicted in FIGS. 1 and 8 is shown in more detail in FIGS. 10-15 and has transit displacement of approximately 28,000 ton at a transit draft, in this embodiment 6.6 meter, and a maximum displacement of approximately 60,000 ton at a maximum draft, in this embodiment 11.6 meter.

Figure 12:
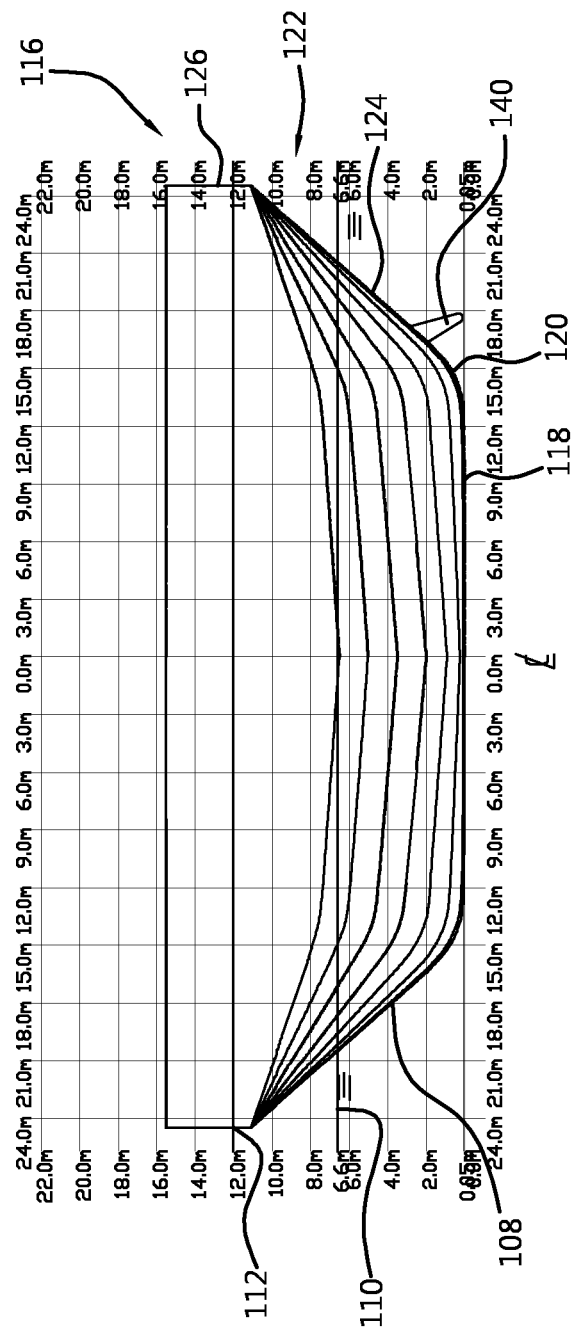
Figure 13:
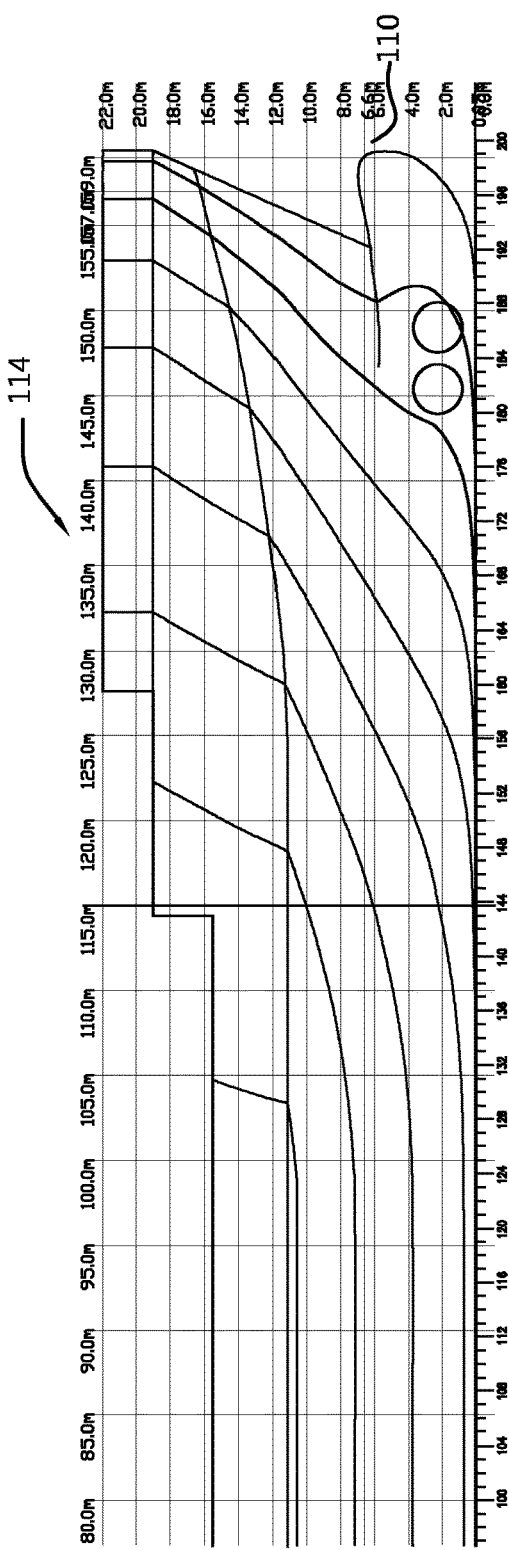
Figure 14:
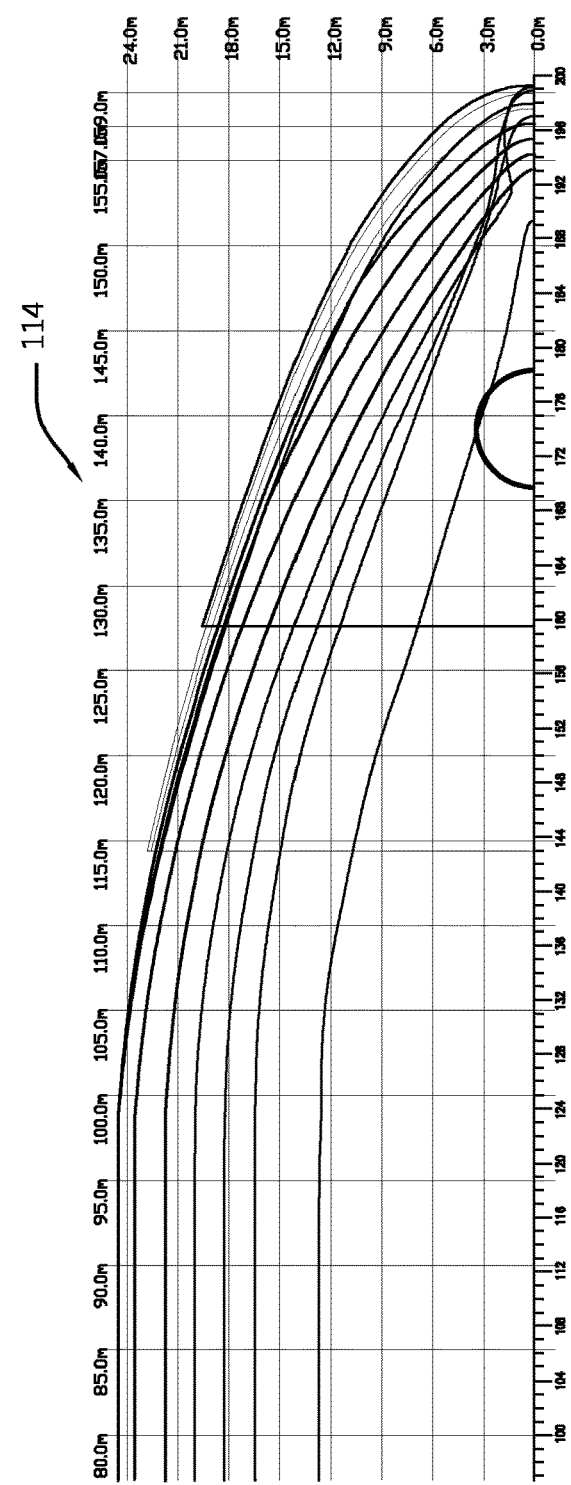
Figure 15:
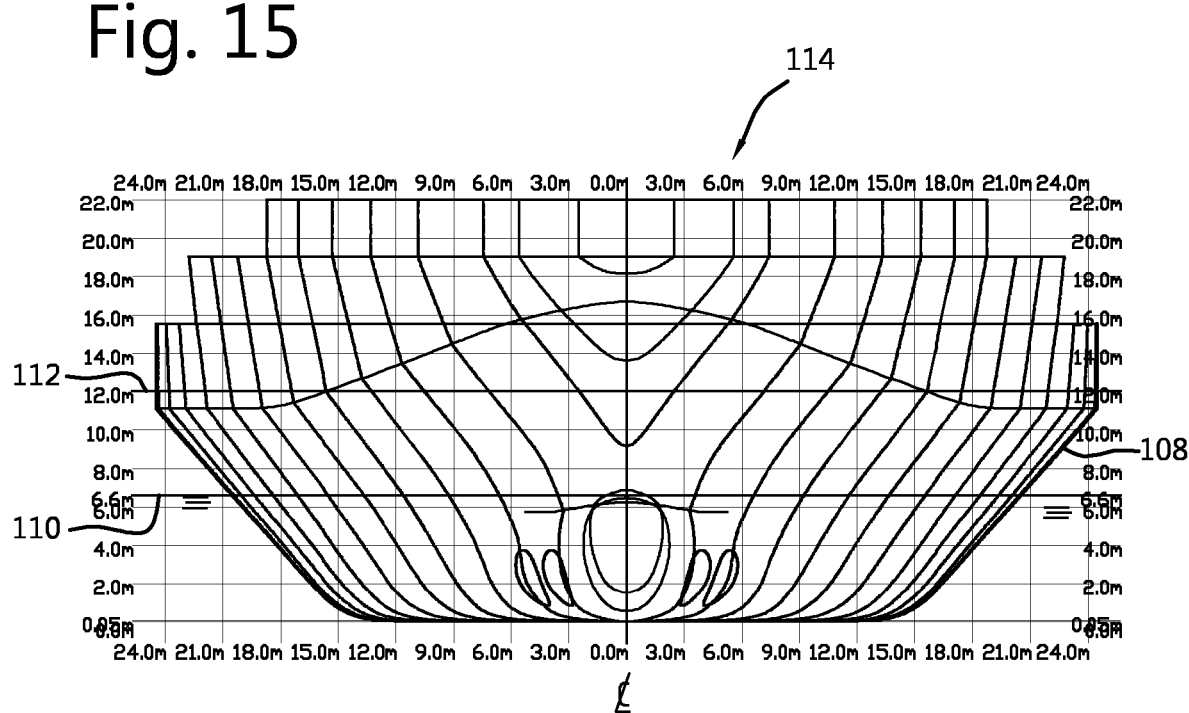

The hull shape is defined by frames as shown in FIGS. 12 and 15, which comprises a main frame 108. The hull shape is further defined by waterlines, comprising a transit waterline 110 at the transit draft, and a maximum waterline 112 at the maximum draft.

The hull shape is symmetrical with respect to a centreline plane CL which extends in a horizontal length and a vertical height direction of the hull 3. The single hull 3 has a design length along the maximum waterline, which in this embodiment is 157 meter, and a maximum width, which is in this embodiment is 49 meter. The main frame 108 is halfway the design length. The part of the single hull in front of the main frame 108 is referred to as fore part 114 of the hull 3 and the part of the single hull 3 aft of the main frame 108 is referred to as aft part 116 of the hull 3.

The single hull 3 comprises a bottom 118, a bilge 120, and a side 122. The bilge 120 is the transition between the bottom 118 and the side 122. The side 122 comprises an oblique side part 124 and a vertical side part 126. The vertical side part 126 is at a greater distance from the centreline plane CL than the bilge 120. The vertical side part 126 ends at its upper side at the main, or upper deck 5. The depth of the hull 3 to the main deck of this embodiment is 15.5 meter. The oblique side part 124 extends from the bilge 120 to the vertical side part 126.

The upper margin of the bilge 120 is tangent to the lower margin of the oblique side part 124. Put differently, the bilge 120 merges smoothly into the oblique side part 124. In this embodiment, the height of the oblique side part 124 is approximately 10 meter, the inclination of the oblique side part with respect to centreline plane is approximately 45°.

Figure 11:
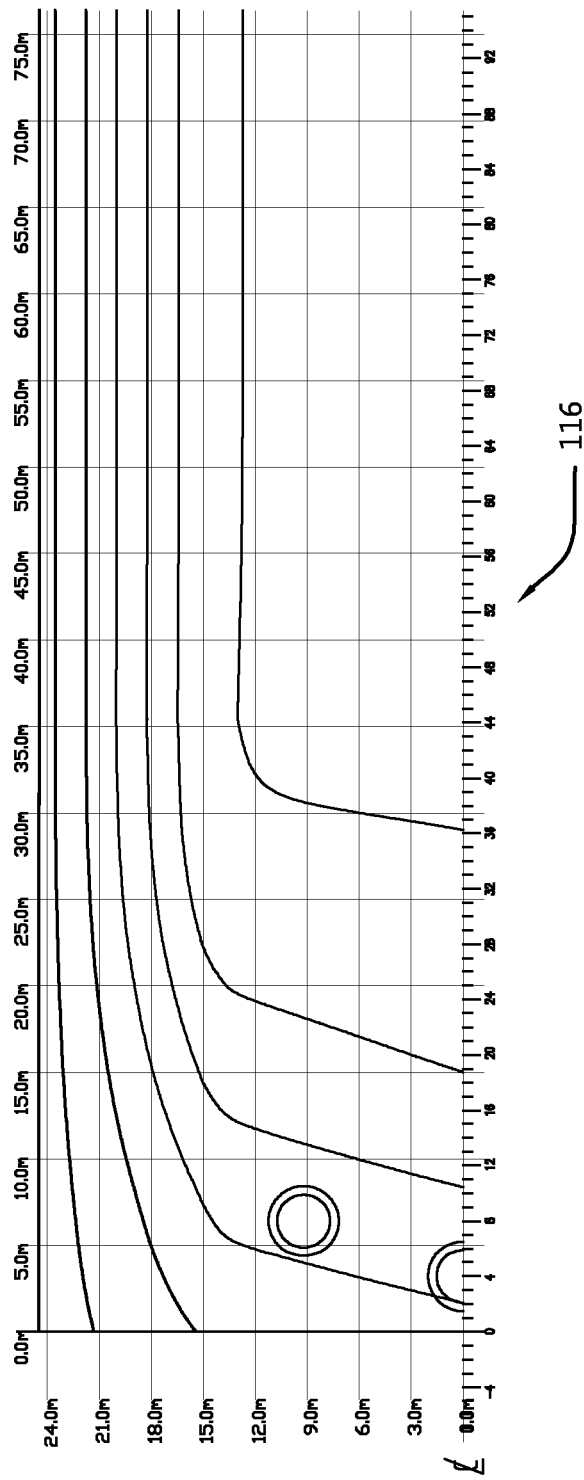

The transit waterline 110 intersects the oblique side part 124. The maximum draft 112 intersects the vertical side part 126. Referring to FIGS. 11 and 12, it shown that the vertical side part 126 has a width which equals to the maximum width over substantially the whole 16 length of the aft part 116 of the hull 3. The vertical side part 126 has a width which equals to the maximum width over substantially 27 meter, measured from the main frame 108.

The oblique side part 124 extends over the full length of the hull 3. The vertical side part 126 merges into the oblique side part 124 in the fore part of the hull. Put differently, there is no buckle line in the foremost part of the hull 3. All waterlines of the oblique side 124 part are fairing from the front to the aft of the vessel, and all waterlines of the vertical side 126 part are fairing from the front to the aft of the vessel. Put differently, the hull shape is smooth in the length direction from the aft to the bow. Only a buckle line defining the vertical side part 126 interrupts the smooth hull in vertical direction.

Figure 16:
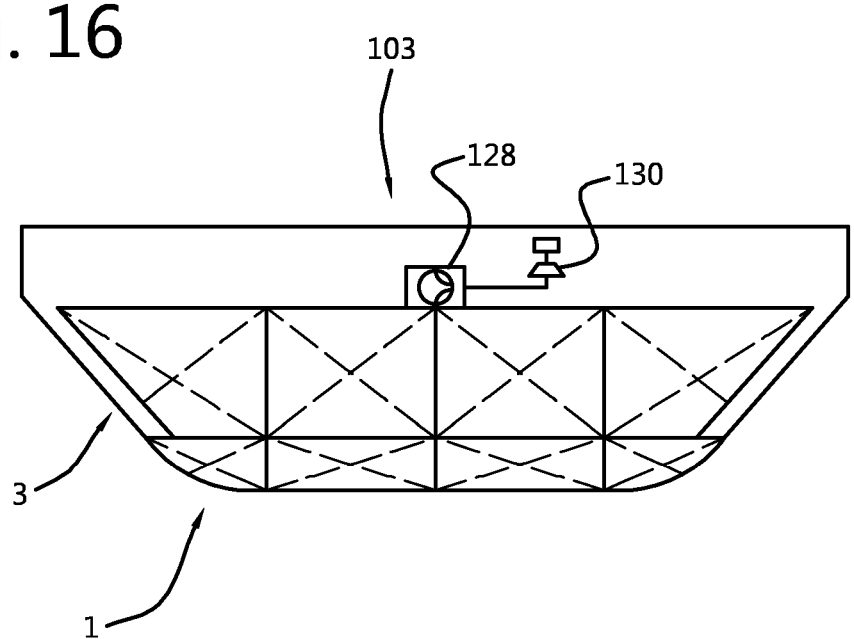
FIG. 16 depicts a ballast system suitable for the vessel according to the invention.

The ballast system 103 comprises pumps, of which one pump 128 is schematically shown in FIG. 16, a control unit in the form of a computer 130, and ballast water tanks 132. The ballast water tanks 132 have a capacity which is at least equal to the difference between the maximum displacement and the transit displacement. 32000

The vessel 1 comprises a bilge-keel 140 (shown only on one side of the vessel) with a height, measured from attachment at the hull to an outer edge, of 2.5 meter, which is in this embodiment 21% of the maximum draft.

In use, the vessel 1 will sail to an off-shore location. Arriving a the location, the vessel will take in ballast water to increase the draft from the transit draft to an increased draft, which is preferably the maximum draft. The crane 10 will install the wind turbine at sea at the increased draft. At this maximum draft, the vessel 1 has a maximum metacentre height, which results in a relative stable ship during heavy-lifting operations. Typically, heel angles will be 1° to 2°. Such small angles are not only achieved by the large metacentre height, but also by the ballast system 103. By pumping water from the side tanks at one side to side tanks at the other side of the vessel, the shifting of the weight of the lifted structure is compensated for. Additionally, or alternatively, the ballast system may comprise a large weight which is moveable with cables and winches from one side of the vessel to the other side. Such a ballast system is disclosed in WO-2009/048322 by the same applicant, which disclosure is incorporated here by reference. Such a system may alternatively be referred to as a roll damping device, in which movement of a damping weight in width direction of the hull is caused to compensate for roll motion of the vessel. A roll damping device may also be provided when there is no ballast system provided to change the draft of the vessel.

After installation, the ballast water is discharged to reduce the draft to the transit draft. For relative light structures, it may be not necessary to increase the draft, or it may be sufficient to increase it to a lesser extent. The resulting lower metacentre height will generally result in less vessel motions due to waves.

In general, the width of the vessel will be at least 30 meter. The maximum draft may intersect the oblique side part too.

The hull may have more or less buckle lines than the one in the preferred embodiment. Their may be a buckle at the transition of the bilge into the oblique side part, which buckle may be positive, to the outside, or negative, to the inside of the hull. The transition from oblique side part to vertical side part may be rounded. Instead of a rounded bilge as disclosed, a straight bilge may be applied, which is oblique with respect to the centre line plane. Preferably, such a straight bilge has an angle to the centreline plane which is larger than the angle of the oblique side part. The off-shore installation vessel is preferably positioned using a dynamic positioning system with thrusters. However, positioning using anchors and/or tug boats is also possible.

In the shown embodiment, the difference between the transit draft and the maximum draft is 5 meter, which is between 30% and 35% of the depth of the hull. More in general, the difference between the transit draft and the maximum draft is at least 25% of the depth of the hull.

Figure 17A:
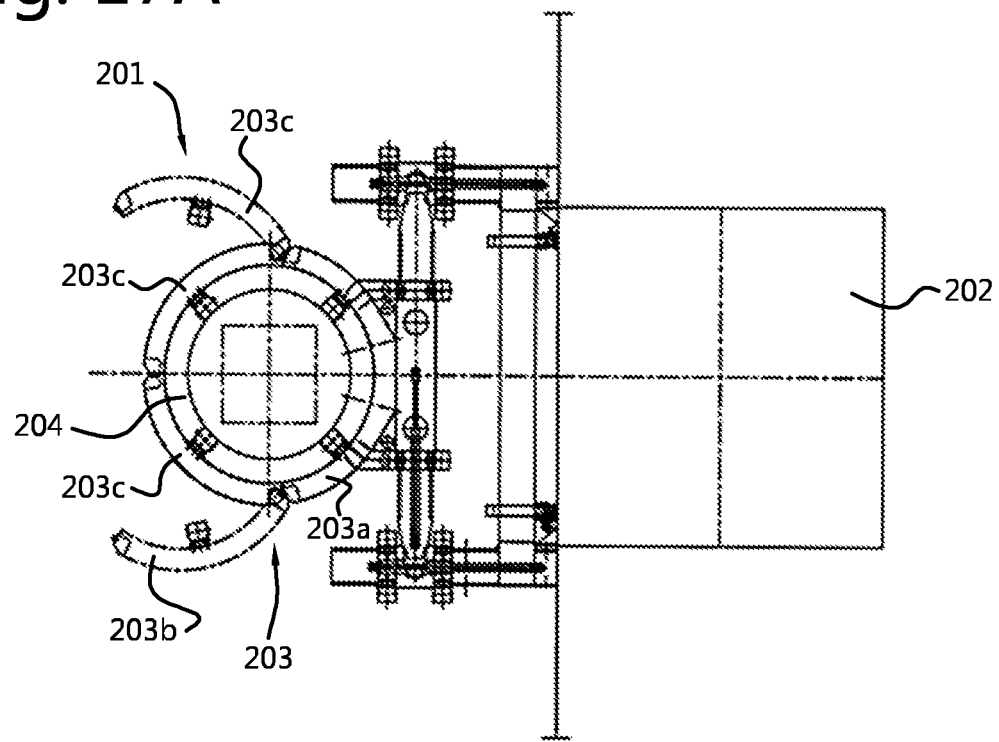
FIG. 17 depicts a pile holder.
Figure 17B:
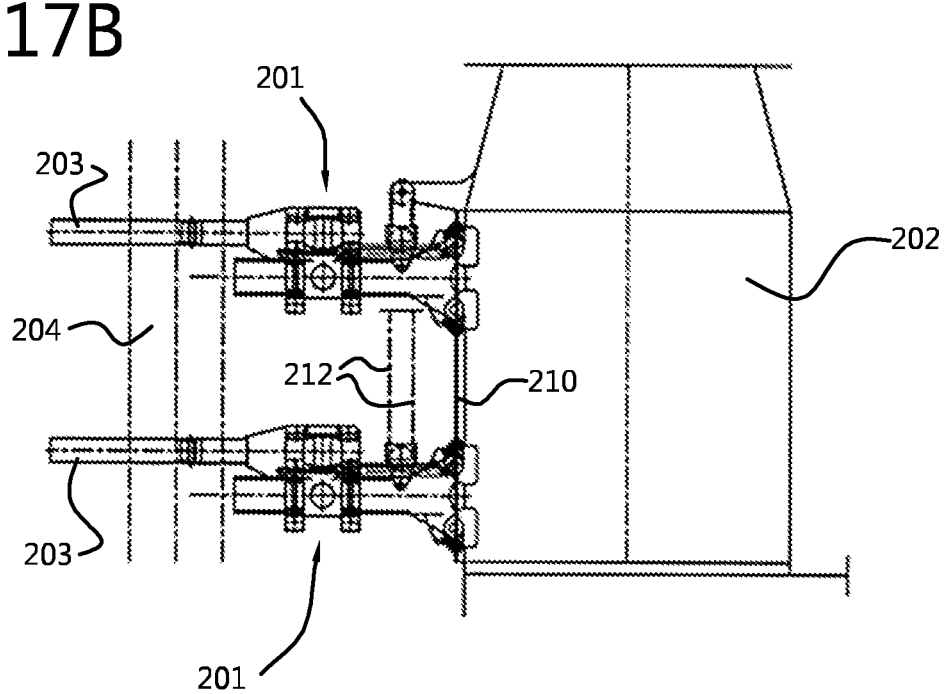

FIG. 17 depicts a top view of a pile holder 201 in the upper drawing indicated by the symbol A, and a side view with the pile holder 201 in two different positions in the lower drawing indicated by the symbol B.

The pile holder 201 is in this embodiment arranged at the aft of the vessel below the rotatable part of the crane 10. This area is indicated in FIG. 1 by dashed box 200. The non-rotatable part of the crane 10 may be referred to as the pedestal 202.

The pile holder 201 comprises a ring-shaped element 203 comprising in this embodiment three members, namely a stationary member 203a and two moveable ring members 203b and 203c. The moveable members 203b and 203c are moveable between an open position to receive a pile 204 in the element 203 or to allow the pile 204 to leave the element 203, and a closed position in which the ring element substantially surrounds the pile 204 and prevents 18 the pile 204 from leaving the ring element. The open position of the ring members 203b, 203c is shown in dashed lines and the closed position is shown in solid lines.

The ring members comprise roll elements to engage with the pile 204 and allowing rotational movement around the vertical and/or a translation of the pile in vertical direction relative to the pile holder.

The pile holder therefore provides a connection between vessel and pile, which may be advantageous during wind turbine installation or assembly. It is for instance possible for a crane to hoist a foundation pile, provide the foundation pile in the pile holder and subsequently drive the foundation pile into the sea bottom while holding the foundation pile with the pile holder. The pile holder may further be used to anchor the vessel to an already installed foundation pile to assemble the wind turbine mast, nacelle and blades. This minimizes the relative movement between vessel and foundation pile.

Alternatively or additionally, the pile holder may be used to hold the lower end of a wind turbine mast during installation thereof on the foundation pile to prevent the lower end from swaying too much.

In the lower drawing of FIG. 17, it can be clearly shown that the pile holder 201 is moveable along the pedestal 202 of the crane 10 in vertical direction. During movement, the pile holder is guided by rails 210. Movement is caused by one or more hoisting device of which the hoisting cables 212 are clearly visible.

Movement of the ring members 203b, 203c may be caused hydraulically or electrically.

Figure 18:
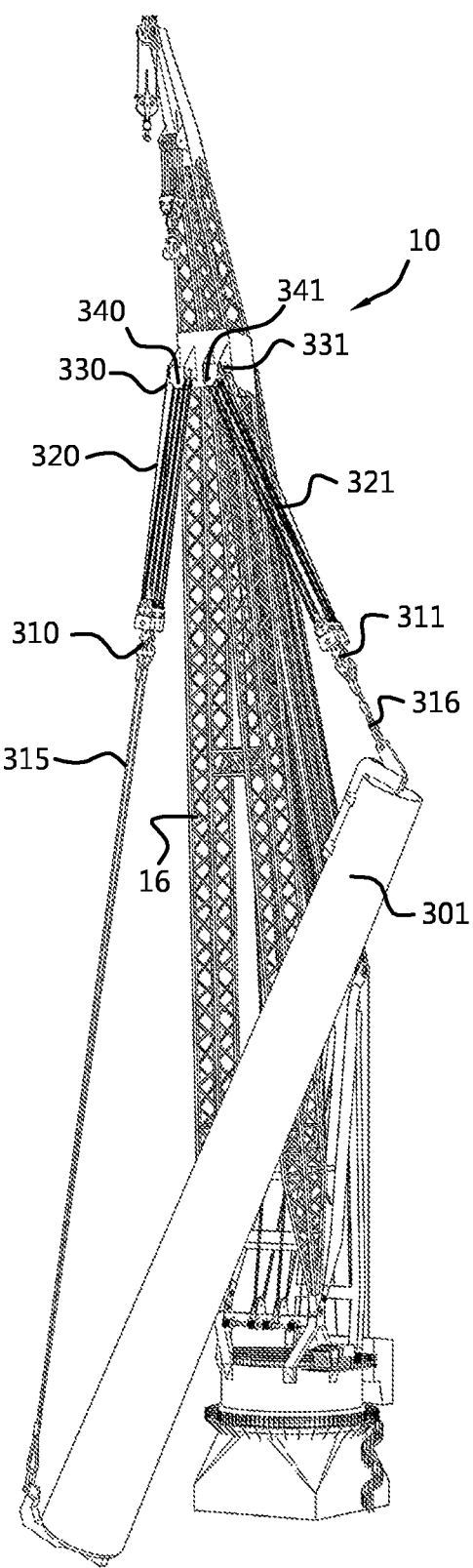
FIG. 18 depicts the upending of a wind turbine mast.

FIG. 18 depicts a crane 10 according to the invention. The crane 10 is provided with a hoisting system specifically suitable for upending foundation piles or wind turbine masts 301 transported in a substantially horizontal orientation on the deck of a vessel. This hoisting system may also be present in the cranes according to the other shown embodiments.

The hoisting system depicted in FIG. 18 comprises two load connectors 310, 311, each load connector being connected to a respective free end of the mast 301 via a sling 315, 316, respectively. Cables 320, 321 extend between the respective load connectors 310, 311 and respective sheave blocks 330, 331 at the upper end of boom 16. The sheave blocks 330, 331 are pivotable about pivot axis 340, 341, respectively, to be directed towards the free end of the respective mast 301. This allows spreading of the cables 320, 321 as shown in FIG. 18. In addition to this feature, the sheave blocks may also be pivotable about a pivot axis perpendicular to the pivot axes 340, 341 to allow the cables 320, 321 to extend downwardly independent of the tilting orientation of the boom 16.

The cables 320 and 321 can be hauled in or paid out independently from each other to allow raising of one end of the mast 301 while suspending the entire mast 301 as is shown in FIG. 18.

The invention claimed is:

1. A crane configured for hoisting a wind turbine blade held in a horizontal orientation in a frame during the hoisting, the crane comprising:
    a crane structure defining a substantially vertical rotation axis;
    a boom connected with a first end thereof to the crane structure so as to be rotatable about said vertical rotation axis along with the crane structure;
    a trolley that is mounted moveable along the boom in a longitudinal direction of the boom;
    a hoisting cable; and
    a load connector,
    wherein the load connector is arranged at a free end of the hoisting cable and is configured to be connected to a frame holding a wind turbine blade held in a horizontal orientation in a frame during hoisting,
    wherein the trolley comprises:
        a cable guide configured to guide the hoisting cable; and
        an attachment configured to temporarily attach the load connector to the trolley in order to fix a position of the load connector relative to the trolley; wherein the load connector comprises a sheave block, and wherein the attachment forms a cavity in which the sheave block is received upon hauling in the hoisting cable.

2. The crane according to claim 1, wherein the crane comprises holding support cables configured to connect the load connector to the frame holding a wind turbine blade.

3. The crane according to claim 1, wherein a hoisting plane is defined by said vertical rotation axis and the boom, and wherein the cable guide of the trolley, the hoisting cable, and the load connector are all arranged in said hoisting plane.

4. The crane according to claim 3, wherein the crane comprises a first pair of tugger lines, said first pair of tugger lines being configured to position the frame holding a wind turbine blade in a rotational direction about a horizontal axis which extends in said hoisting plane that is defined by the vertical rotation axis and the boom.

5. The crane according to claim 4, wherein the first pair of tugger lines are arranged to extend between the boom at a location above the trolley and the frame holding a wind turbine blade on either side of said hoisting plane.

6. The crane according to claim 4, further comprising a second pair of tugger lines, said second pair of tugger lines being configured to position the frame holding a wind turbine blade in a rotational direction about a vertical axis which extends in said hoisting plane that is defined by the vertical rotation axis and the boom.

7. The crane according to claim 6, wherein the second pair of tugger lines are arranged to extend between the trolley and the frame holding a wind turbine blade on either side of said hoisting plane.

8. The crane according to claim 1, wherein the hoisting cable runs from a fixed location at a free end of the boom downwards towards the cable guide on the trolley.

9. The crane according to claim 1, wherein the hoisting cable is permanently provided from the trolley towards the cable guide.

10. The crane according to claim 1, the crane further comprising a frame configured to hold a wind turbine blade in a horizontal orientation during hoisting.

11. The crane according to claim 10, wherein the frame comprises a clamping mechanism configured to fix the wind turbine blade relative to the frame and a power unit to power the clamping mechanism.

12. A vessel comprising the crane according to claim 1.

13. A method for hoisting a wind turbine blade held in a horizontal orientation in a frame during the hoisting, wherein the method makes use of the crane according to claim 1, wherein the method comprises:
    arranging the hoisting cable such that the hoisting cable is guided by the cable guide on the trolley;
    positioning the trolley over the frame holding a wind turbine blade in a horizontal orientation;
    connecting the frame to the load connector; and
    lifting the frame and the wind turbine blade held in a horizontal orientation.

14. The crane according to claim 1, wherein the crane comprises holding support cables configured to connect the load connector to the frame holding a wind turbine blade.

* * * * *